Sept. 5, 1939.   L. LEITZ ET AL   2,171,660
SHUTTER MECHANISM FOR ROLL FILM CAMERAS
Filed May 5, 1937
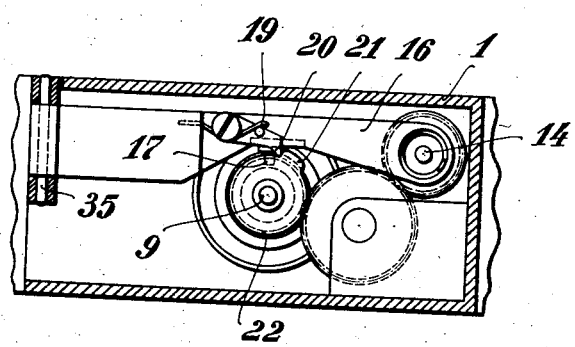
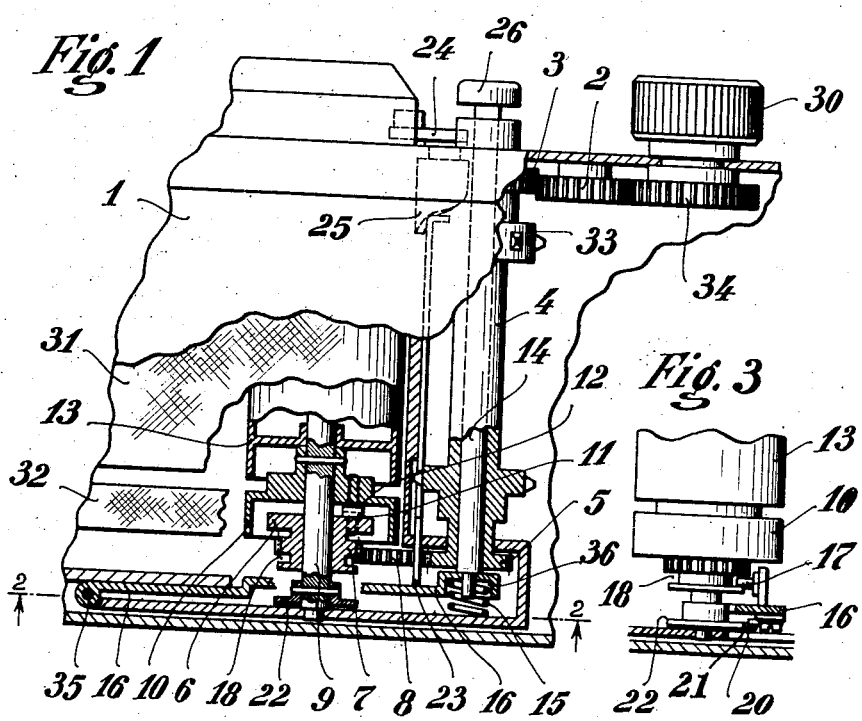
INVENTORS
Ludwig Leitz, Wilhelm Albert
BY
Ivan E. A. Konigsberg
ATTORNEY Patented Sept. 5, 1939

2,171,660

UNITED STATES PATENT OFFICE 2,171,660

SHUTTER MECHANISM FOR ROLL FILM CAMERAS

Ludwig Leitz and Wilhelm Albert, Wetzlar, Germany, assignors to Ernst Leitz G. m. b. H., Wetzlar, Germany Application May 5, 1937, Serial No. 140,850
In Germany June 18, 1936

4 Claims. (Cl. 95—57)

This invention relates to shutter mechanisms for roll film cameras of the type in which the shutter rewinding mechanism and the film advancing mechanism are coupled together so that when the film is advanced for the next picture, the shutter is rewound at the same time. Such an arrangement necessarily includes a number of parts such as for instance for operatively coupling the shutter rewinding mechanism and the film advancing mechanism. Hence, when the shutter is released and operated in the usual manner by means of springs, such coupling members are also operated, hence the shutter springs require a greater degree of tensioning and the operation is not as smooth and frictionless as may be desired. Another disadvantage resides in the fact that the shutter release in such case requires greater force for operation and this in turn causes unevenness when the release is operated and pictures may become blurred.

The object of this invention is to improve such a shutter mechanism whereby to obtain a more smooth and easy operation. The invention is embodied in a shutter mechanism in which the coupling members between the shutter rewinding mechanism and the film advance mechanism is placed upon the shaft which carries the shutter curtain roller and ribbon drum. A holding pawl is also provided for holding the shutter in rewound position instead of having the coupling members perform this function. The release member is arranged to operate a lever which in turn actuates the coupling members. This construction includes a smooth soft release operation which eliminates shaking and the like and insures greater certainty in the taking of pictures. In the accompanying drawing illustrating the invention Fig. 1 is a view of a portion of a roll film camera illustrating the invention and with parts removed and parts in section.

Fig. 2 is a sectional view taken on the line 2—2 of Fig. 1 and looking upward.

Fig. 3 is a detail view illustrating the coupling member.

Fig. 1 illustrates a portion of a well known type of camera in which the shutter consists of two curtains which are operated between curtain rollers to form an exposure. The curtains are attached to curtain rollers and by means of ribbons to ribbon drums. Spring rollers are provided to move the curtains in one direction to open and close the shutter and rewinding means is provided to rewind the shutter springs for the next operation. Inasmuch as such shutters and their detailed construction and operation is well known in the art Fig. 1 shows only so much of the shutter mechanism per se as is necessary for understanding this invention.

Referring to Fig. 1 the one shutter curtain 31 is attached to a curtain roller 13. The numeral 32 indicates one of the ribbons for attaching the other curtain, not shown, to the ribbon drum 10. It will be understood by all persons familiar with this type of camera that the curtains are wound up upon the roller 13 and drum 10, both being carried by the same curtain rewinding shaft 9. Also, that when the shutter is released, by means hereinafter explained, the shutter springs, not shown, draw the curtains from the right to the left in the drawing and unwind them from the curtain roller 13 and the drum 10.

The film, not shown, is wound upon a film rewinding roller, not shown, by means of a film roller 4 having sprocket wheels 33 which engage the perforations in the film in the usual manner. At the top the roller 4 carries a gear 3 which is operated from a rewinding knob 30 by gears 34 and 2. After each exposure the rewinding knob 30 is operated to rotate the rewinding roller and through the gears 34, 2 and 3 rotate the film transport roller 4 whereby to advance the film one picture length and wind it up. This operation is known in the art. At the bottom the film roller 4 carries a gear 5 which by means of another gear 8 drives a gear 7 fast on the coupling member 6 which also includes an annular recess 18. The coupling member is rotatably mounted upon the curtain roller shaft 9 and carries an upstanding pin 11 adapted to engage a depending pin 12 secured to the ribbon drum 10.

To the bottom of the curtain roller shaft 9 there is secured a disk 22 provided with a tooth 21, see Fig. 2, adapted to be engaged by a pawl 20 having a spring 19 and carried by a lever 16 which is pivoted at 35. The lever 16 extends from its pivot, past the shaft 9 and over to the right where it forms a recess 36 for a spring 15. The shutter release shaft 14 extends down inside the film roller 4 into the said recess 36 as shown. At the top the release shaft carries a release knob 26. The lever 16 carries a tooth 17, Fig. 3, which engages the annular recess 18 in the coupling member. The numeral 23 indicates a rod which rests upon the lever 16 and which is adapted to be operated vertically by a cam 25 which is rotated by a handle 24. The camera is indicated generally by the numeral 1. It will be noted from Fig. 3 that the pawl 20 engages the disk 22 in the upper half thereof. Thus, when the lever 16 is depressed the tooth 17 completely causes uncoupling of the two pins 11 and 12 before the pawl 20 passes down out of engagement with the disk 22.

The operation is as follows: The drawing shows the parts in their normal positions at rest and it will be understood that the camera has been properly loaded with film which stretches from the film roller 4 to the other side of the camera. It will also be understood that the shutter has been rewound so that when the shutter release is operated the shutter curtains will be unwound from the roller 13 and the drum 10, these two members being rotated from right to left in the drawing as the shutter is operated. All of this is familiar to persons acquainted with this type of camera.

When it is desired to take a picture, the operator depresses the release shaft 14 which moves the lever 16 down against the spring 15. The tooth 17 and the holding pawl 20 are both carried by the lever 16, hence when the latter moves down the tooth 17 moves the coupling member down to disengage the pins 11 and 12, and the holding pawl 20 is disengaged from the disk 22 and tooth 21. The shutter shaft 9 is now free to move unrestrained and free from engagement with the gears 7, 8 and 5. The shutter is operated in the usual manner and the exposure is made.

An exposure having been made, the operator lets go of the release knob 26 and commences to rewind the shutter and advance the film for the next picture. When the pressure upon the shutter release shaft 14 is removed, the spring 15 moves the lever 16 up into normal position. The tooth 17 on the lever moves the coupling member 6 up so that the pin 11 engages the pin 12 and the pawl 20 is moved into the plane of the tooth 21. The rewinding knob 30 is now rotated whereby the film roller is rotated by way of the gears 34, 2 and 3. At the same time the gear 5 drives the gear 8 and the coupling gear 7. The pin 11 by engagement with the pin 12 rotates the curtains rewinding roller shaft 9 and the curtains are now rewound upon the roller 13 and the drum 10. In other words when the film is advanced the shutter is rewound by way of the coupling member 6. At the end of the rewinding movement which is stopped by the tooth 21 striking a fixed pin, not shown, the pawl 20 snaps in behind the tooth 21 and prevents accidental return movement. The parts are so arranged that there is a small amount of free play so that when the rewinding movement is completed, the pawl 20 serves as the sole holding member against the pull of the shutter springs upon the shaft 9.

From the foregoing it will be clear that inasmuch as the shutter release shaft 14 only serves to depress the lever 16, which has a long leverage, the release shaft as such has very little work to do, hence a smoother and softer release is obtained free from sudden jars. It will also be observed that when the shutter release is operated, the shutter springs operate the shaft 9, the curtain roller 13 and drum 10 free from engagement with the coupling members. Hence there is less friction to overcome and a smoother, more steady shutter operation is the result.

The film is unwound from the film roller 4 and wound back into the film cartridge, not shown, in the usual manner. During this operation the coupling member 6 is uncoupled from the film roller 4 by turning the handle 24 to rotate the cam 25 which in turn depresses the rod 23 to lower the lever 16 and disengage the coupling gear 7 from the gear 8.

We claim:

1. A shutter mechanism for roll film cameras including a focal plane shutter comprising a leading and a follow up curtain, curtain rollers supporting the curtains, a shutter rewinding shaft upon which the said curtain rollers are mounted to rewind the curtains after the shutter has been released to make an exposure, a rewinding mechanism including a coupling member for normally operatively connecting the said rewinding shaft with the rewinding mechanism, means for holding the rewinding shaft in shutter rewound position and means for actuating said coupling member to completely disconnect the said rewinding shaft from the said rewinding mechanism when the shutter is released and to disconnect the rewinding shaft from the said holding means.

2. A shutter mechanism for roll film cameras including a focal plane shutter comprising a leading and a follow up curtain, curtain rollers supporting the curtains, a shutter rewinding shaft upon which the said curtain rollers are mounted to rewind the curtains after the shutter has been released to make an exposure, a rewinding knob remote from said rewinding shaft, a plurality of gears interposed between the said knob and shaft for driving the latter when the knob is operated, a coupling member slidably carried by the shaft for normally operatively connecting the shaft with the said gears, a disk on said shaft, a holding pawl engaging said disk to hold the shaft in normal shutter rewound position, a lever supporting said pawl, means operatively connecting the lever and the said coupling member and a shutter release member for actuating said lever to operate the said coupling member to completely disconnect the said rewinding shaft from the said plurality of gears and thereafter to disconnect the said pawl from the said disk.

3. A shutter mechanism for roll film cameras including a focal plane shutter comprising a leading and a follow up curtain, curtain rollers supporting the curtains, a shutter rewinding shaft upon which the said curtain rollers are mounted to rewind the same after it has been released to make an exposure, a rewinding mechanism for rotating said shaft to rewind the shutter, means for holding said shaft in normal shutter rewound position, a coupling member, means for supporting the coupling member in operative relation to the rewinding shaft and to the rewinding mechanism and means for moving the coupling member into position to operatively connect the rewinding shaft with the rewinding mechanism preparatory to rewind the shutter after an exposure and for completely disconnecting the rewinding shaft from the rewinding mechanism and from the said holding means when the shutter is released.

4. In a photographic roll film camera including a film advancing mechanism, a focal plane shutter comprising a leading and a following curtain, curtain rollers supporting said curtains, a shutter rewinding mechanism, a knob for simultaneously operating the said two mechanisms to advance the film and rewind the shutter after an exposure, a shutter rewinding shaft upon which the said curtain rollers are mounted, means for holding said shaft in normal shutter rewound position, a coupling member on the shutter rewinding shaft for normally connecting the shaft to the said two mechanisms, means for operating the coupling member to completely disengage the shutter rewinding shaft from the said two mechanisms and from the said holding means when the shutter is released whereby to operatively disengage the shutter curtains from all connection with the said two mechanisms.

LUDWIG LEITZ.
WILHELM ALBERT.